United States Patent [19]
Wood

[11] Patent Number: 5,158,112
[45] Date of Patent: Oct. 27, 1992

[54] FLEXIBLE DUCT

[76] Inventor: Cecil H. Wood, 129 Arnold Avenue, Thornhill, Canada

[21] Appl. No.: 379,636

[22] Filed: Jul. 13, 1989

Related U.S. Application Data

[63] Continuation of Ser. No. 255,766, Oct. 11, 1988, abandoned, which is a continuation of Ser. No. 900,222, Aug. 22, 1986, abandoned, which is a continuation of Ser. No. 726,931, Apr. 26, 1985, abandoned, which is a continuation of Ser. No. 538,365, Oct. 3, 1983, abandoned, which is a continuation of Ser. No. 855,185, Nov. 28, 1977, abandoned, which is a continuation of Ser. No. 674,306, Apr. 6, 1976, abandoned.

[30] Foreign Application Priority Data

May 14, 1975 [GB] United Kingdom ............... 20357

[51] Int. Cl.$^5$ ............................................. F16L 11/11
[52] U.S. Cl. ................................... 138/135; 138/122; 138/131; 138/134; 138/154
[58] Field of Search ............... 138/121, 122, 129, 131, 138/132, 133, 134, 135, 154

[56] References Cited

U.S. PATENT DOCUMENTS

| | | | |
|---|---|---|---|
| 1,270,579 | 6/1918 | Witzenmann | 138/135 |
| 2,337,373 | 12/1943 | Chernack | 138/131 |
| 2,417,676 | 3/1947 | Chernack | 138/135 |
| 2,452,047 | 10/1948 | Hamblin | 138/133 |
| 2,763,292 | 9/1956 | Rejeski | 138/131 |
| 3,085,596 | 4/1963 | Rejeski | 138/133 |

FOREIGN PATENT DOCUMENTS

| | | |
|---|---|---|
| 446351 | 1/1948 | Canada . |
| 453574 | 12/1948 | Canada . |
| 453575 | 12/1948 | Canada . |
| 453576 | 12/1948 | Canada . |

Primary Examiner—James E. Bryant, III
Attorney, Agent, or Firm—Laff, Whitesel, Conte & Saret

[57] ABSTRACT

The following specifications discloses a flexible duct constructed from a spiral of channel-shaped metal with the legs of the channel facing inwards of the spiral.

A strip of cloth or other flexible webbing material is formed into a spiral with its overlapping edges folded into the channel of the spiral with a cord or string filling the remainder of the channel cavity before the channel legs are crimped together to maintain the webbing strips edges fast together within its grip. The expansibility of the duct is increased by increasing the width of strip of webbing.

2 Claims, 1 Drawing Sheet

FLEXIBLE DUCT

This is a continuation of pending application Ser. No. 07/255,766 filed Oct. 11, 1988, now abandoned, which is a continuation of application Ser. No. 06/900,222 filed Aug. 22, 1986, now abandoned, which is a continuation of application Ser. No. 06/726,931 filed on Apr. 26, 1985, now abandoned which is a continuation of application Ser. No. 06/538,365 filed on Oct. 3, 1983, now abandoned, which is a continuation of application Ser. No. 05/855,185 filed on Nov. 28, 1977, now abandoned, which is a continuation of application Ser. No. 05/674,306 filed on Apr. 6, 1976, now abandoned in the name of Cecil Howard Wood, covering "Flexible Duct".

FIELD OF THE INVENTION

The present invention relates to ducts and more particularly to ducts in the form of flexible tubing manufactured from a spiral or coil of metallic material having a yieldable fabric covering thereover. The principal characteristic of the ducts formed as above are that they are flexible thereby allowing their installation in factories and large buildings to be done with a minimum of labour for cutting and bending unlike the prior common duct installations of sheet metal. Another desirable attribute of combined coil metal and fabric ducts is that they are compressible thereby permitting great lengths of duct to be packaged and transported economically.

PRIOR ART

It is known to manufacture a length of tubing for a duct to carry air, fumes and the like to and from heating systems and exhaust fans, by covering an extended coil or spiral of metal with a yieldable, compressible material such as cloth that can be stretched over the coil freely and attached by gluing or the like to the coil at positions that provide a maximum elongation position of the spiral as desired. The minimum compressed posture of the coil depends only upon the compressibility of the fabric.

It is known however that rough usage during installation of a tubing having a cloth cover over a spiral wire frame, can cause damage to the cloth cover resulting in an unsatisfactory duct which cannot be neatly repaired. Also, it is known that when duct work is required to be both flexible and periodically moveable when handled by maintenance personnel and machine operators, the cloth readily becomes damaged and the duct thereby useless for its purpose of carrying away exhaust gases and the like.

OBJECTS OF THE INVENTION

It is the primary object of the present invention to provide a compressible, flexible duct having a fabric webbing attached between adjacent coils of a spiral skeleton or frame wherein the frame is on the outside of the finished duct with the webbing facing inwards. The coils appearing on the outside of the duct facing outwards provide a considerable measure of protection to the cloth webbing not hitherto possible and also results in a reasonably smooth inner surface to the duct without the discontinuities of frame as formerly. The ducting of the present invention can withstand considerably more rough handling, on construction sites for example, than known products.

It is also known that when large ducts of a foot or more in diameter are required, the spiral frame must be of substantially greater strength and size. It is also an object of the invention to provide an inner filler core of cord and the like to assist in the firm retention of the webbing in the closed and pinching edges of the channel frame.

SUMMARY OF THE INVENTION

A preferred embodiment of the invention comprises a spiral of metallic material such as aluminum forming a frame and having a channel shaped cross section with the opening in the channel facing inwardly when in the coiled position. A coil of webbing cloth is mated with the coil of the metallic frame to form a continuous tubing or duct therewith. Adjacent edges of the coil of cloth are overlapped, gathered together and fitted into the opening in the channel of the frame. Compression of the edges of the opening in the channel section with the overlapped edges of the cloth webbing held therebetween results in a clamping seam of metal following the spiral of cloth to form a flexible but continuous tube of cloth suitable for a duct or the like. Prior to compression of the channel edges a filler core of cord or string is fed into the seam to ensure that the cavity in the channel is entirely filled.

With the foregoing in view, and such other purposes for the invention and advantages and novel features apparent from the accompanying drawings the invention is comprised, embodied and embraced in the construction, arrangement and combination of parts herein exemplified.

The following detailed description of the preferred embodiment of the invention is referenced to the following drawings in which like reference numerals refer to like parts.

IN THE DRAWINGS

THE PREFERRED EMBODIMENT OF THE INVENTION

Figure 1:
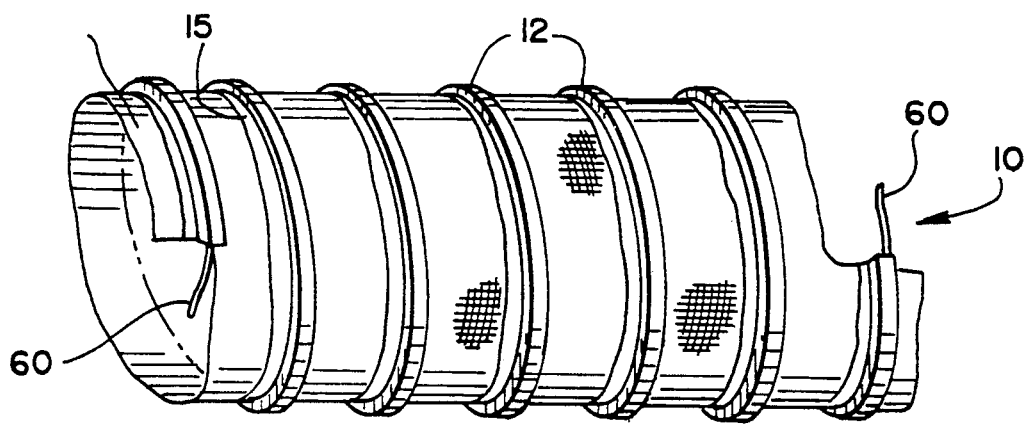
FIG. 1 is a perspective view of a section of tubing or duct shown in the extended position and made according to the invention herein.
Figure 2:
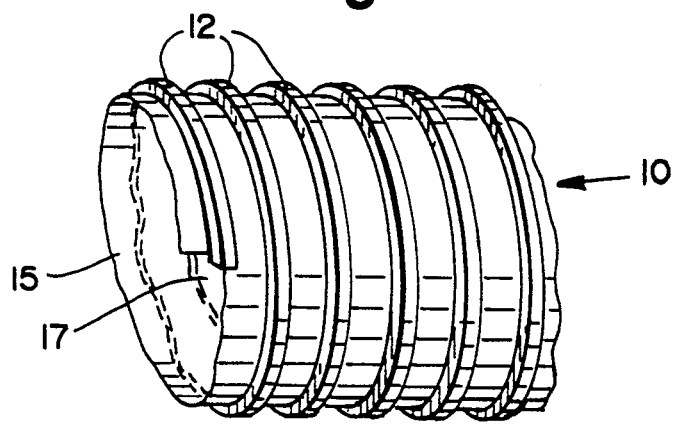
FIG. 2 is a perspective view of the section of duct of FIG. 1 shown in the compressed position.
Figure 3:
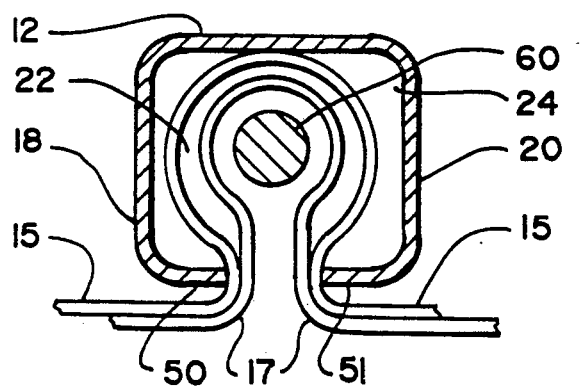
FIG. 3 is a sectional view through a flexible duct showing a filler core inserted in the cavity within the overlapping webs of covering.

In FIG. 1, numeral 10 designates a section of ducting or tubing composed of a spiral frame 12 made from a coil of channel shaped metal. A webbing of cloth 15, covers the interstices between the coils and is held by the spiral of coil as shown in FIG. 3, where 15 designates one strip of web of cloth and 17 designates an adjacent web from a strip of cloth. The channel 12 has two inwardly facing arms 18,20, forming a cavity 22 therebetween.

It is understood that other materials such as sheet plastic and aluminum foil and the like could be used for the webbing material without departing from the scope of the invention disclosed.

It has been found that there is a tendency with both very stiff and very soft webs 17 for such webs to slip out of the channel crimping of the channel edges 50, 51 can be achieved to clamp the combination together.

A preferred means of preventing the strips of crimped and folded edges of webbing from slipping from the enclosing channels prior to clamping is to fill the remainder of the channel inner wall and the loosely folded cloth with a core member such as a or string 60. FIG. 3 shows in cross-section a cord or string 60 in place filling the channel 12.

Note also that FIG. 3 reveals that cloth webbing 15, which enters the interior of channel 12 near channel edge 50, has a portion which exits from channel 12 near the other channel edge 51 and overlies cloth webbing 17 so as to be visible from the outside of the duct 10. Similarly, FIG. 3 also reveals that cloth webbing 17, which enters the interior of the channel 12 near channel edge 51, has a portion which exits from channel 12 near the other channel edge 50, and underlies cloth webbing 15.

Therefore, after the channel 12 of the spiral frame has been systematically closed upon the cloth webbing 15,17 enclosed therein, the cord or string 60 within the channel 12 will hold the caught edges of the strips of cloth 15,17, against the inside surface of the channel 12, thereby resisting a tendency of the cloth 15,17 to pull out the channel 12 when the duct 10 is being handled and flexed during installation and usage.

What is claimed is:

1. A flexible duct having a substantially cylindrical shape whereby to define radially outward and radially inward directions relative to said cylindrical shape, said duct having a radially outwardly facing surface; and comprising:

an elongated self-supporting frame member which contributes most or all of the structural strength of said duct;

said frame member extending helically about said outwardly facing surface and being formed with a channel-shaped cross-section;

said channel-shaped cross-section defining a hollow interior of said frame member, and including a pair of channel edges mutually confronting each other and spaced apart to define a channel opening therebetween;

said channel opening facing radially inwardly;

an elongated strip of webbing formed of a flexible non-self-supporting material forming a substantially cylindrical wall of said duct;

said webbing having a pair of elongated opposite margins;

both of said webbing margins entering said hollow interior of each helical turn of said frame member through said channel opening from mutually opposite directions, and being disposed within said hollow interior in mutually overlapping relationship;

and an elongated core member helically disposed within said hollow interior of said frame member and at least partially encircled by said overlapping webbing margins;

said core member being sufficiently flexible to contribute little or no structural strength to said duct and to be easily displaced toward said channel opening by said webbing margins in response to forces tending to pull said webbing margins out of said hollow interior of said frame member;

the combined thickness of said core member and said encircling webbing margins substantially exceeding the width of said channel opening;

so that said core member within said hollow interior of said frame member holds said encircling webbing margins against said hollow interior, thereby resisting any tendency of said webbing margins to pull out of said hollow interior during installation and usage of said flexible duct.

2. A duct as in claim 1 wherein a visible portion of at least one of said webbing margins exits from said hollow interior of said frame member through said channel opening, on the opposite side of said core member from which it entered.

* * * * *